May 6, 1924.  
A. MACLACHLAN  
1,492,997  
CONTINUOUS REDUCTION PROCESS FOR TREATING WASTE ORGANIC MATTER  
Filed July 28, 1920
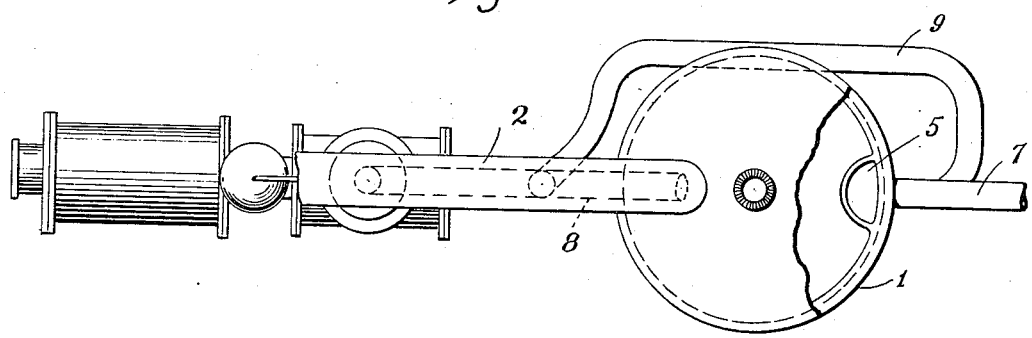
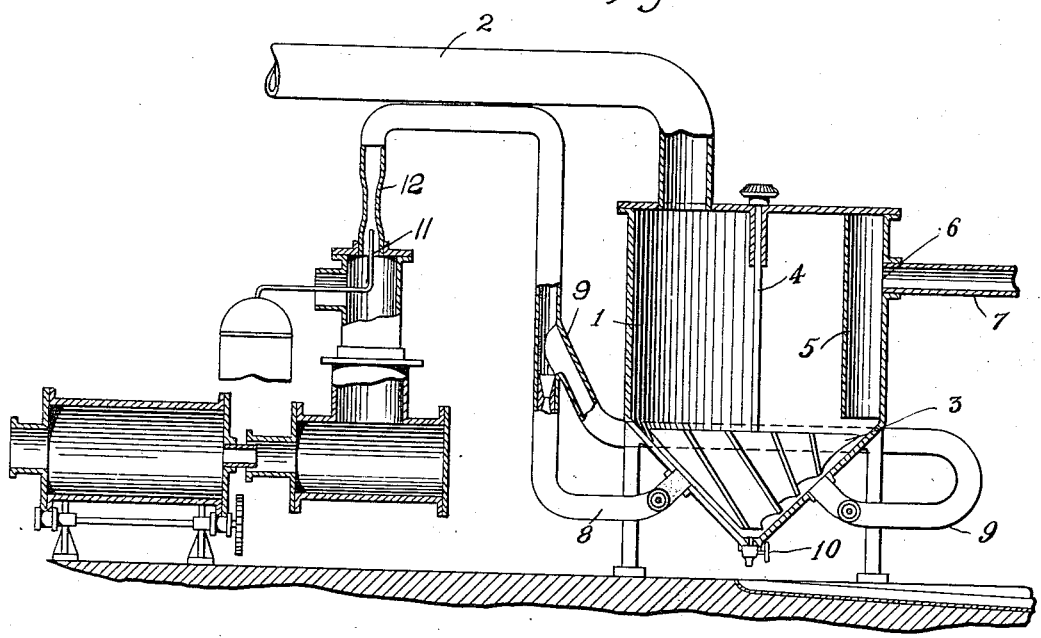
Inventor  
ANGUS MACLACHLAN  
By his Attorney  
H. Dorsey Spencer Patented May 6, 1924.

1,492,997

UNITED STATES PATENT OFFICE.

ANGUS MACLACHLAN, OF PERTH AMBOY, NEW JERSEY, ASSIGNOR TO MACLACHLAN REDUCTION PROCESS CO., OF NEW YORK, N. Y., A CORPORATION OF DELAWARE.

CONTINUOUS REDUCTION PROCESS FOR TREATING WASTE ORGANIC MATTER.

Application filed July 28, 1920. Serial No. 399,590.

*To all whom it may concern:*

Be it known that I, ANGUS MACLACHLAN, a citizen of the United States, residing at Perth Amboy, New Jersey, have invented certain new and useful Improvements in Continuous Reduction Processes for Treating Waste Organic Matter, of which the following is a clear, full, and exact description.

My invention relates to a method and apparatus for continuously treating waste organic matter, and while it is especially adapted to the treatment of mixed waste organic matter such as garbage, it is also suitable to the treatment of other forms of waste organic substances. A feature of the invention consists in continually supplying the substances to be treated, subjecting them to the action of an oxidizing agent preferably $SO_2$, and continuously removing the waste matter after treatment. After removal the matter may be further treated if desired.

While my process may be carried out in a great variety of ways, for the purpose of this application I have shown, more or less diagrammatically, a form of apparatus which is suitable to the practice of my improved process.

Fig. 1 is a plan view, and

Fig. 2 is an elevation partly in section.

Referring to the drawings, this apparatus consists of a receptacle 1 to which leads a supply pipe 2, through which the waste organic substances to be treated are introduced into the receptacle. If desired, a suitable stirrer may be provided, said stirrer being represented by 3, the same being in the form of a propeller blade mounted on a shaft 4, which may be driven in any suitable manner. The receptacle 1 is provided with a baffle-plate 5 which separates a portion of the receptacle from the remaining portion. This baffle-plate extends from the top of the receptacle to a position near the bottom thereof, forming a chamber closed at the top but open at the bottom. An opening 6 is provided in the side of the receptacle leading into this chamber and into the opening is introduced a pipe 7 which may lead to a settling tank or to another container for further treatment. Such further treatment may consist in transferring the matter to a drying chamber or to a press. Pipes 8 and 9 entering the receptacle near its lower end supply $SO_2$ gas. This gas may be generated by burning sulphur, and any suitable form of apparatus for this purpose may be provided, such for instance as that shown in my Patent No. 1,359,086. Preferably the gas is mixed with steam in the pipes 8 and 9 as shown at 11 and 12.

The waste matter is continuously supplied through the inlet 2 and drops into the container 1 where at the lower portion thereof it is subjected to the action of the $SO_2$ gas, it being stirred meanwhile. The gas acts to cause a breaking up of the water, grease and other dirt which is mixed with the garbage. These substances pass into the chamber formed by the baffle-plate and flow out at the opening 6 and into the pipe 7, from which they may pass to another tank for further treatment or for settling, or for drying, pressing or filtering, as desired. The rate of flow of the material through the inlet 2 is so regulated that the contents of the tank is subjected to the action of the $SO_2$ gas for a sufficient time to cause breaking up of the matter so that the grease may separate from the water and other heavier materials when permitted to do so.

Due to the action of the stirrer, also to the agitation caused by the inflow of the gas and steam through the pipes 8 and 9, the contents of the receptacle will be subject to constant agitation, at least in the region of the pipes, and after the substances to be treated have come into intimate contact with the gas and steam and been sufficiently broken up, they pass out at the opening 6. The baffle plate 5 prevents the untreated waste matter as it is introduced near the top of the receptacle from passing out through the pipe 7, permitting only those substances to pass out after they have been subjected to the action of the gas. There will, of course, be some settling of the heavier materials below the place where the pipes 8 and 9 enter, especially if no stirrer is used, and in some cases it may be advantageously be omitted.

The receptacle 1 has an opening at the bottom closed by a valve 10, and at any time excess water which may have gathered within the receptacle near the bottom thereof may be drawn off, if desired. It may also be desired to have this water flow continuously from near the bottom of the receptacle, and for this purpose the valve 10 may be kept always open to a small extent, or other means may be provided whereby the water is continuously drawn off from the matter in the receptacle 1.

It is well known that waste organic substances contain considerable water, and especially is this true of green garbage, the water content in such case probably being as high as 85%. By the treatment above described, a separation of a very large quantity of this water may be effected in an early stage of the process, and the amount of tankage space necessary for the treatment of large quantities of garbage is considerably reduced. Another important result is that the matter is completely deodorized after treatment with the $SO_2$ for a comparatively short time. This deodorization is particularly facilitated by reason of the fact that the green garbage is introduced comparatively slowly into the receptacle.

Having thus described my invention, what I claim and desire to secure by Letters Patent is:

1. The method of treating waste organic matter, which consists in feeding said matter continuously into a receptacle, subjecting it to the action of $SO_2$ for sufficient time to cause a breaking up of the matter whereby the grease, water and other heavy substances separate, intermittently removing the water and other precipitates, and continuously removing the lighter substances.

2. The method of treating waste organic matter, which consists in feeding said matter continuously into a receptacle, subjecting it to the action of $SO_2$ for sufficient time to cause the breaking up of the matter whereby the grease, water and other heavier substances may separate, continuously removing such substances and subjecting them to a pressing process to remove the grease.

3. The method of treating waste organic matter, which consists in feeding said matter continuously into a receptacle, subjecting it to the action of $SO_2$ for sufficient time to cause the breaking up of the matter whereby the grease, water and other heavier substances may separate, continuously removing such substances and subjecting them to a pressing process to remove the grease, and drying the residue.

4. The method of treating waste organic matter, which consists in feeding said matter continuously into a receptacle, subjecting it to the action of $SO_2$ and steam and continuously removing the matter after sufficient treatment.

5. The method of treating waste organic matter, which consists in feeding said matter continuously into a receptacle, subjecting it to the action of $SO_2$ and steam for sufficient time to cause a breaking up of the matter whereby the grease, water and other heavy substances may separate, intermittently removing the water and other precipitates, and continuously removing the lighter substances.

6. The method of treating waste organic matter, which consists in feeding said matter continuously into a receptacle, subjecting it to the action of hot $SO_2$ for sufficient time to cause a breaking up of the matter whereby the grease, water and other heavy substances may separate, intermittently removing the water and other precipitates, and continuously removing the lighter substances.

Signed at New York city, New York, this 14th day of June 1920.

ANGUS MACLACHLAN.